(12) United States Patent
Agrawal et al.

(10) Patent No.: US 12,284,647 B2
(45) Date of Patent: Apr. 22, 2025

(54) GROUPING WIRELESS COMMUNICATION RESOURCES AND ASSIGNING DATUMS TO THE GROUPINGS BASED ON CHARACTERISTICS OF THE DATUMS

(71) Applicant: Skylo Technologies, Inc., Palo Alto, CA (US)

(72) Inventors: Meghna Agrawal, Cupertino, CA (US); Andrew Nuttall, Mountain View, CA (US); Christopher Acker, Los Altos, CA (US)

(73) Assignee: Skylo Technologies, Inc., Palo Alto, CA (US)

( * ) Notice: Subject to any disclaimer, the term of this patent is extended or adjusted under 35 U.S.C. 154(b) by 408 days.

(21) Appl. No.: 17/939,039

(22) Filed: Sep. 7, 2022

(65) Prior Publication Data

US 2024/0080836 A1 Mar. 7, 2024

(51) Int. Cl.
*H04B 7/185* (2006.01)
*H04W 72/02* (2009.01)
*H04W 72/1268* (2023.01)
*H04W 76/10* (2018.01)

(52) U.S. Cl.
CPC ...... *H04W 72/1268* (2013.01); *H04B 7/1851* (2013.01); *H04W 72/02* (2013.01); *H04W 76/10* (2018.02)

(58) Field of Classification Search
CPC ............. H04W 72/1268; H04W 72/02; H04W 7/1851
USPC ........................................................ 370/316
See application file for complete search history.

(56) References Cited

U.S. PATENT DOCUMENTS

| | | | |
|---|---|---|---|
| 5,513,379 A | 4/1996 | Benveniste et al. | |
| 7,133,418 B1 | 11/2006 | Macridis et al. | |
| 2003/0032429 A1 | 2/2003 | Macridis et al. | |
| 2004/0107281 A1 | 6/2004 | Bose et al. | |
| 2016/0006500 A1* | 1/2016 | Radpour | H04B 7/18539 455/427 |
| 2020/0092882 A1* | 3/2020 | Kato | H04W 72/542 |

* cited by examiner

*Primary Examiner* — Temica M Beamer
(74) *Attorney, Agent, or Firm* — Brian R. Short

(57) ABSTRACT

Apparatuses, methods, and systems for wireless communication are disclosed. One method includes dividing available wireless communications resources into a plurality of groups, connecting, by a wireless device, to a base station through a wireless satellite link, allocating, by the base station, a set of the plurality of groups to the wireless device, receiving, by the wireless device, a datum from a data source, assigning, by the wireless device, the datum to one or more of the allocated groups based on characteristics of the datum, and wirelessly communicating, by the wireless device, the datum to the base station according to the assigned one of the plurality of groups.

17 Claims, 8 Drawing Sheets

Valid Periodicities of Data Transmission

GROUPING WIRELESS COMMUNICATION RESOURCES AND ASSIGNING DATUMS TO THE GROUPINGS BASED ON CHARACTERISTICS OF THE DATUMS

FIELD OF THE DESCRIBED EMBODIMENTS

The described embodiments relate generally to wireless communications. More particularly, the described embodiments relate to systems, methods, and apparatuses for grouping wireless communications resources and assigning datums to the grouping based on characteristics of the datums.

Background

Current data networks are designed primarily for human users and the network and traffic characteristics that human users generate. The growth and proliferation of low-cost embedded wireless sensors and devices pose a new challenge of high volumes of low bandwidth devices vying for access to limited network resources. One of the primary challenges with these new traffic characteristics is the efficiency at which the shared network resources can be used. For common low bandwidth applications such as GPS tracking, the efficiency (useful/useless data ratio) can often be below 10%. This inefficiency is the result of large volumes of devices communicating in an uncoordinated environment. Addressing this problem is fundamental to the future commercial viability of large-scale sensor network deployments.

It is desirable to have methods, apparatuses, and systems for grouping wireless communications resources and assigning datums to the grouping based on characteristics of the datums.

SUMMARY

An embodiment includes a method of wireless communication. The method includes dividing available wireless communications resources into a plurality of groups, connecting, by a wireless device, to a base station through a wireless satellite link, allocating, by the base station, a set of the plurality of groups to the wireless device, receiving, by the wireless device, a datum from a data source, assigning, by the wireless device, the datum to one or more of the allocated groups based on characteristics of the datum, and wirelessly communicating, by the wireless device, the datum to the base station according to the assigned one of the plurality of groups.

Another embodiment includes a satellite wireless communication system. The satellite wireless communication system includes a wireless device, and a base station. The base station is configured to divide available wireless communications resources into a plurality of groups and allocate a set of the plurality of groups to the wireless device. The wireless device is configured to connect to the base station through a wireless satellite link, receive a datum from a data source, assign the datum to one or more of the allocated groups based on characteristics of the datum, and wirelessly communicate the datum to the base station according to the assigned one of the plurality of groups.

Other aspects and advantages of the described embodiments will become apparent from the following detailed description, taken in conjunction with the accompanying drawings, illustrating by way of example the principles of the described embodiments.

DETAILED DESCRIPTION

Figure 1:
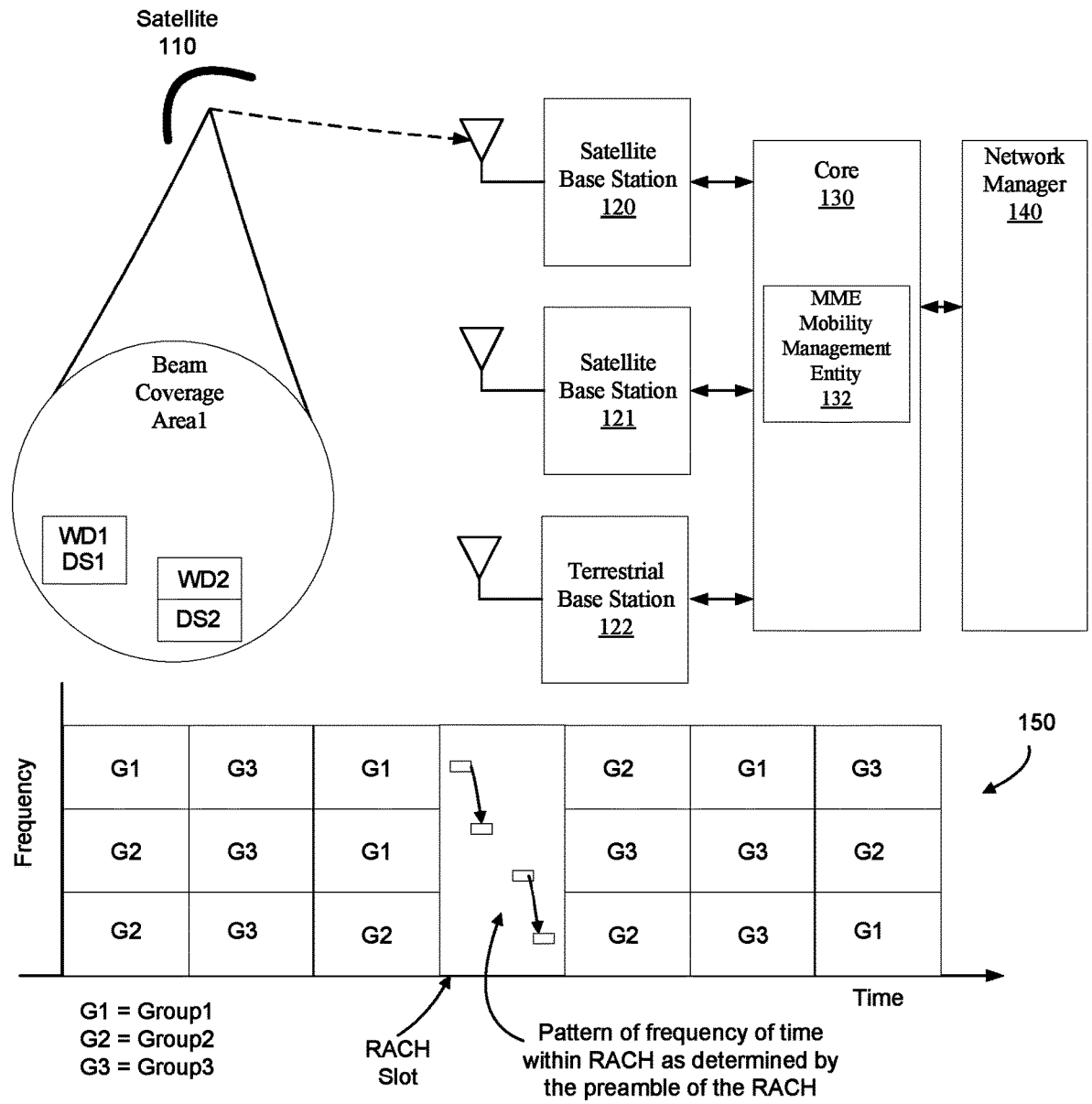
FIG. 1 shows a satellite wireless communication network that includes grouping of wireless communication resources, according to an embodiment.

The embodiments described include methods, apparatuses, and systems for grouping wireless communications resources and assigning datums to the grouping based on characteristics (such as, time sensitivity) of the datums.

For at least some of the described embodiment, rather than a base station or other upstream entity scheduling the uplink communication, the base station assigns and provides groups of wireless communications resources to wireless devices, and the wireless devices assign datums for uplink communications to the assigned groups based on the characteristics of the datums.

For an embodiment, available wireless communications resources are divided into a plurality of groups. Further, a base station allocates a set of the plurality of groups to a wireless device connecting to the base station through a wireless satellite link. For an embodiment, the groups formed by the base station create multiple virtual networks. That is, for an embodiment, the base station creates the groups of wireless resources, wherein for an embodiment, a wireless resource may be defined as a time and frequency slot on an uplink data channel, a time and frequency slot on a downlink data channel, a preamble code on a random-access channel (RACH), or a time and frequency slot on a broadcast data channel.

For an embodiment, the base station further allocates one or more wireless resource groups to the wireless device, wherein the applicable wireless resources required by the wireless device are sourced from the one or more allocated wireless resource groups. For an embodiment, the wireless device then uses the allocated radio resources at its own accord. For an embodiment, the wireless device may select a specific preamble code from a list of preamble codes available in the assigned wireless resources groups to that device. For an embodiment, when the base station receives the preamble code selection (communication) of a wireless resource group, the base station assigns an uplink data channel time and frequency slot from that same wireless resource group to the wireless device. For an embodiment, the base station allocates wireless resource groups to wireless devices during the network attachment process of the wireless devices. For an embodiment, the assignment of wireless resources is based upon network traffic characteristics. For an embodiment, the wireless resource groups are created across a very discrete set of radio resources spanning different channel types. Further, the groups are assigned to wireless devices, thereby giving wireless devices the autonomy to independently select and bring into use radio resources with an allocated group as appropriate for the resource type. As stated, wireless communications resources (frequency subcarriers, time slots, and/or RACH (random access channel) slots available for the wireless communications) are divided into groups. A set of the plurality of groups are allocated to a wireless device that is connecting to a network base station through a wireless satellite link. For an embodiment, the set of the plurality of groups is a subset of the plurality of groups. Generally, different sets of groups are allocated to different connecting wireless devices. When the wireless device receives datum(s) to be communicated upstream to the base station through the wireless satellite link, the wireless device assigns the datum(s) to one or more of the allocated groups based on characteristics (such as, time sensitivity) of the datum. Finally, the wireless device wirelessly communicates the datum to the base station according to the assigned one or more of the set of the allocated plurality of groups.

FIG. 1 shows a satellite wireless communication network that includes grouping of wireless communication resources, according to an embodiment. As shown, the satellite wireless communication network includes a plurality of base stations 120, 121, 122 operating to establish a wireless link through one or more satellites (such as, satellite 110) to wireless devices (such as, wireless devices WD1, WD2). For an embodiment, the base stations 121, 122, 123 are connected to a core network 130 that includes a mobility management entity (MME) 132. For an embodiment, the core network 130 is connected to a network manager 140.

For an embodiment, a base station (such as any one of the base stations 120, 121, 122) is configured to observe network traffic characteristics between the base station and a plurality of wireless devices (such as, wireless devices WD1, WD2). The observed network characteristics include, for example, channel utilization observed at different times of the day, types and distributions of traffic (that is, bursty traffic, periodic traffic, SOS—emergency traffic, delay tolerant traffic—data/statistics), and/or delays (can be obtained from core 130) observed historically. For example, if the observed traffic is dominated by SOS/real time traffic, the base station may assign more resources in a delay sensitive traffic group. For an embodiment, each of the plurality of groups is associated with a type of traffic, wherein the type of traffic includes a delay requirement and/or a size of traffic.

For an embodiment, a wireless satellite link between the wireless devices (WD1, WD2) is formed through a satellite 110 which has a coverage area (beam coverage areal) that includes the wireless devices (WD1, WD2).

For an embodiment, the base station is further configured to adaptively divide available wireless communications resources into a plurality of groups based on the network traffic characteristics. For an embodiment, the available wireless communications resources include frequency spectrum subcarriers, time slots, and/or RACH (random access channel) slots. The frequency spectrum subcarriers can include, for example, one or more subcarriers of an OFDM (orthogonal frequency division multiplexing) signal. For an embodiment, the time slots include one or more time slots of a frame of scheduled wireless communications. Exemplary time slot and frequency spectrum groups (Group 1 (G1), Group 2 (G2), Group 3 (G3), RACH slot) 150 are depicted in FIG. 1.

For at least some embodiment, the plurality of base stations 120, 121, 122 include both satellite network base stations 120, 121, and terrestrial network base station(s) 122. For an embodiment, the base stations 120, 121, 122 coordinate the division of the available wireless communications resources. That is, it is possible that the different base stations 120, 121, 122 have at least partially overlapping coverage areas. Accordingly, when the different base stations 120, 121, 122 divide the available wireless communications resources into groups and allocate the groups to different wireless devices, different base stations 120, 121, 122 coordinate amongst themselves to ensure that different wireless devices of different of the base stations are not allocating groups with overlapping wireless communications resources, thereby minimizing or reducing interference between coverage areas of the different base stations 120, 121, 122.

For an embodiment, the RACH slots include a plurality of preambles and plurality of RACH time slots. For an embodiment, a plurality of RACH time slots is periodic. For an embodiment, when a wireless device is transmitting, the wireless device uses an assigned preamble and the assigned or allocated RACH time slot for transmission.

For an embodiment, a wireless device connects to the base station through a wireless satellite link through a satellite (such as, satellite 110). For an embodiment, the base station then allocates groups of the plurality of groups to the wireless device after detecting connecting of the wireless device.

For at least some embodiments, the wireless device is configured to receive a plurality of datums from one or more data sources. For an embodiment, the datum is a message from a user application residing on the wireless device. That is, the user application is the data source. For an embodiment, one or more data sources are electronically connected to the wireless device.

For an embodiment, the wireless device is further configured to assign each of the datums to one or more of the allocated groups based on a characteristic of the datum. For an embodiment, the wireless device knows or determines the characteristics of the datum based on configuration parameters appended to the body of the datum when the datum is transferred from a primary processor of the wireless device to a modem of the wireless device. For an embodiment, the characteristic of the datum includes a time sensitivity of the datum. For at least some embodiments, the wireless device is configured to assign each of the datums to one or more of the allocated groups based one a size of the data of many datums. For example, if the datum is a part of a large file, the wireless devices can assign the datums of the large file to different groups of the available wireless communications resources. For an embodiment, for example, if the datum is a part of a 1 KB file, then the base station can assign the datum(s) to a resource group at night which is a less congested time.

Finally, after assigning the datum(s) to the allocated groups, the wireless device is configured to wirelessly communicate the datums to the base station according to the assigned one of the plurality of groups.

For an embodiment, the available wireless communications resources are adaptively divided into a plurality of groups based on the network traffic characteristics for uplink wireless communications and downlink wireless communications. For an embodiment, the network traffic characteristics includes characteristics of both uplink and downlink traffic. For an embodiment, the available wireless communications resources are adaptively divided into a plurality of groups based on the uplink network traffic characteristics for uplink wireless communications. For an embodiment, the available wireless communications resources are adaptively divided into a plurality of groups based on the downlink network traffic characteristics and downlink wireless communications. For an embodiment, the adaptively dividing into a plurality of groups based on the uplink network traffic characteristics for uplink wireless communications is independent from the adaptively dividing into a plurality of groups based on the downlink network traffic characteristics for downlink wireless communications, and vice versa.

For an embodiment, the wireless device is configured to provide preferences to the base station regarding the dividing and allocating of the available wireless communications resources into a plurality of groups to the wireless device. For an embodiment, the wireless device shares preferences for particular groups based on, for example, a preferred transmission time, and/or data bandwidth requirements.

For an embodiment, the base station obtains the network traffic characteristics based on historical observation or statistics shared by the core network 130 or application-level services.

For an embodiment, the network traffic characteristics includes link quality characteristics over time per groups of wireless devices or individual wireless devices, and therefore group assignments are influenced accordingly. That is, the link quality characteristics influence the allocations of the group to the different wireless devices. For an embodiment, wireless devices with poor link performance (less than a threshold) are assigned a resource group with elongated transmit timing (that is, allocated longer times for transmission) to support lower modulation and coding schemes, repetitions, retransmissions, or other link enhancement techniques.

For an embodiment, the base station adaptively dividing the available wireless communications resources into a plurality of groups based on the network traffic characteristics includes the base station forming groups based on channel utilization observed at different times of the day, types and distributions of traffic (that is, bursty traffic, periodic traffic, SOS—emergency traffic, delay tolerant traffic—data/statistics), and/or delays (can be obtained from core 130) observed historically. For example, if the observed traffic is dominated by SOS/real time traffic, the base station may assign more resources in a delay sensitive traffic group. For an embodiment, each of the plurality of groups is associated with a type of traffic, wherein the type of traffic includes a delay requirement and/or a size of traffic.

For an embodiment, the base station is further configured to maintain a map of network frequency spectrum slots, time slots, RACH slots available for wireless communication. Further, the base station is configured to assign unallocated available wireless communications resources to newly connecting wireless devices, wherein unallocated available wireless communications resources include 1. unallocated groups of available wireless communications resources or 2. groups of available wireless communications resources not fully allocated. The assigning of unallocated wireless communication resources provides for traffic shaping and provides for more efficient use of the available wireless communications resources. For an embodiment, each group can be assigned to multiple wireless devices and not just one.

For an embodiment, the RACH slots comprise preamble frequency slots (spectrum) and times slots. For an embodiment, the RACH time slots are defined by a period and an offset. That is, each slot occurs according to a selected period including an offset. For an embodiment, a selected period is maintained until an expiry time or for a validity duration. For an embodiment, the expiry time or the validity duration are based on an attachment status of the wireless device and/or network characteristics. For an embodiment a mobile wireless device is assigned a shorter validity period as the mobile wireless device may enter or leave network coverage, while a stationary device may have a longer validity period.

For an embodiment, values of the period and the offset of the RACH slots are dependent on the time sensitivity of the datums. Again, traffic shaping can be influenced to ensure that different wireless devices are not transmitting at the same time. An exemplary group that includes RACH slots may include preamble slots for delay tolerant traffic (for example, having a period 10 minutes and an offset of 54 seconds), or a preamble for delay sensitive traffic. For an embodiment, the objective is to shape the data traffic in such a way that all the wireless devices are not transmitting at the same time.

For an embodiment, a value of the period is based on available resources, current traffic, and historical transmissions by the wireless device. For an embodiment, the value of the period is based on historical transmissions and an observed traffic distribution. The type and distribution of traffic may include bursty traffic, periodic traffic, SOS—emergency traffic, and/or delay tolerant traffic.

For an embodiment, a value of the period for each of different of the plurality groups is selected based on a geometric series of scheduling frames or scheduling subframes. For an embodiment, the values of the periods are based on a series of time units, which can be, for example, a frame, a subframe or a time in minutes. For an embodiment, the time of the geometric series can be selected based upon the data transmission requirement and/or historical traffic pattern observed for the device. For an embodiment, the base stations have different numbers of preambles in different groups while dividing a pRACH slot into periodic groups. As previously stated, for an embodiment, each group has periods selected based on a geometric series, such as, of geometric series—2, 4, 8, 16, 32 subframes, or—5, 10, 20, 40, subframes.

For an embodiment, a modem within the wireless device receives a data transmission request from a user application layer of the wireless device along with the maximum delay the datums can tolerate. For an embodiment, the wireless device allocates the datums to the appropriate group based on the maximum delay the datums can tolerate. For an embodiment, during RRC (radio resource control), the connecting wireless device signals its device type. For example, in msg 5 which is used for RRC connection setup as per NB-IOT standard.

Figure 2:
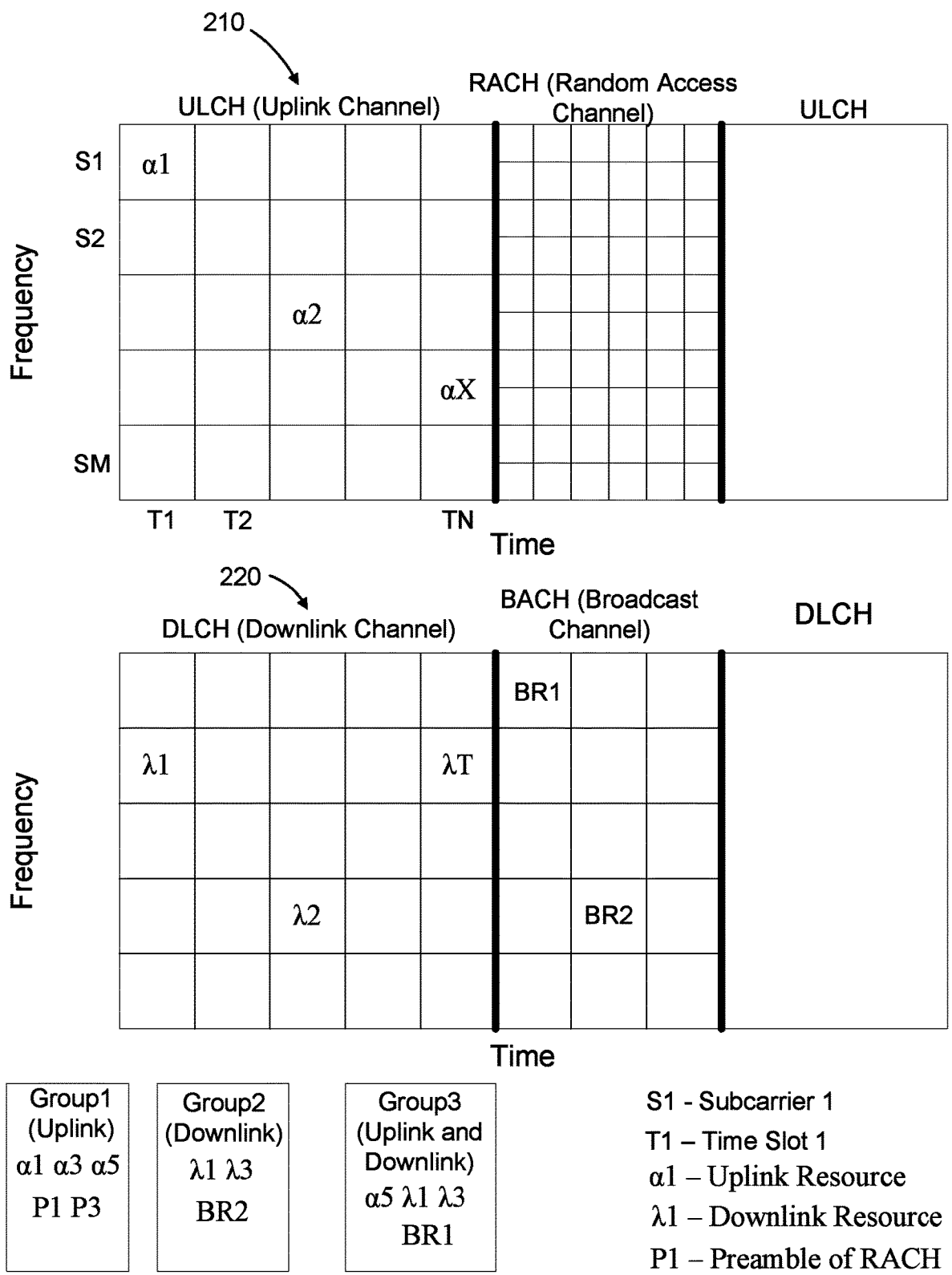
FIG. 2 shows uplink and downlink wireless communications resources, and several possible groupings of the resources, according to an embodiment.

FIG. 2 shows uplink and downlink wireless communications resources, and several possible groupings of the resources, according to an embodiment. An uplink time frame 210 includes uplink channel allocations and RACH channel allocations. A downlink time frame 220 includes downlink channel allocations and broadcast (BR) channel allocations. For an embodiment, the uplink time frame 210 and the downlink time frame 220 include the wireless communications resources that are divided into a plurality of groups.

An exemplary group 1 includes uplink resources $\alpha 1$, $\alpha 3$, $\alpha 5$, P1, P3 in which $\alpha 1$, $\alpha 3$, $\alpha 5$ are uplink channel resources and P1, P3 are preambles of RACH channels. An exemplary group 2 includes downlink resources $\lambda 1$, $\lambda 3$, BR2 in which $\lambda 1$, $\lambda 3$ are downlink channel resources and BR2 is a broadcast channel resource. An exemplary group 3 includes both uplink resources $\alpha 5$ and downlink resources $\lambda 1$, $\lambda 3$, BR1. As previously described, once the available wireless communications resources have been divided into the plurality of groups, the groups can be assigned to connecting wireless devices.

Figure 3:
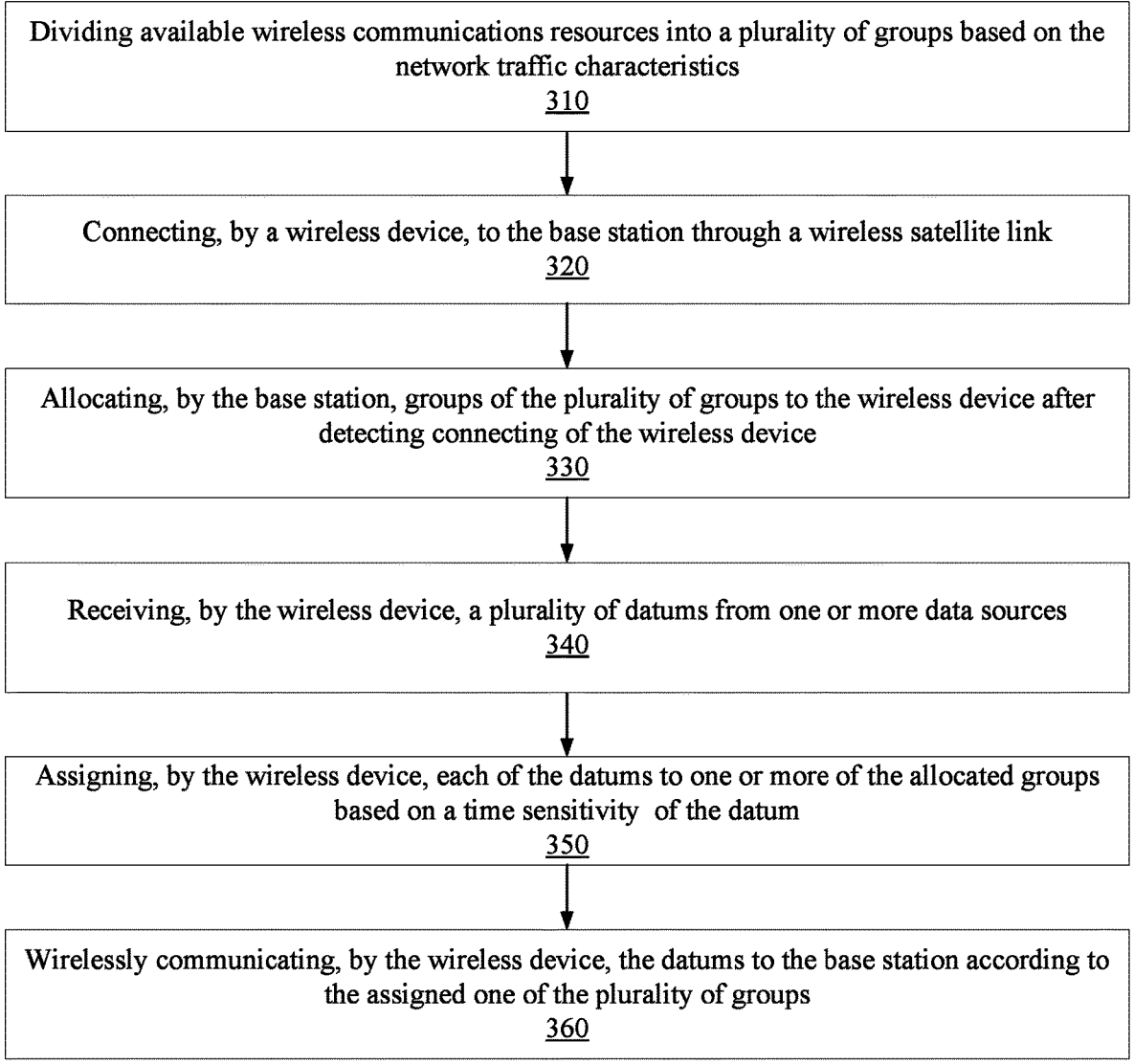
FIG. 3 is a flow chart that includes steps of a method for grouping wireless communications resources and assigning datums to the grouping based on a time sensitivity of the datums, according to an embodiment.

FIG. 3 is a flow chart that includes steps of a method for grouping wireless communications resources and assigning datums to the grouping based on a time sensitivity of the datums, according to an embodiment. A first step 310 includes dividing available wireless communications resources into a plurality of groups. A second step 320 includes connecting, by a wireless device, to a base station through a wireless satellite link. A third step 330 includes allocating, by the base station, a set of the plurality of groups to the wireless device, by a wireless device, to the base station through a wireless satellite link. A fourth step 340 includes receiving, by the wireless device, a datum from a data source. A fifth step 350 includes assigning, by the wireless device, the datum to one or more of the allocated groups based on characteristics of the datum. A sixth step 360 includes wirelessly communicating, by the wireless device, the datum to the base station according to the assigned one of the plurality of groups.

For an embodiment, the data source is internal to the wireless devices. For example, for an embodiment, the datum is a message from a user application residing on a wireless device. That is, in this case the user application is the data source.

For an embodiment, dividing available wireless communications resources into a plurality of groups includes adaptively dividing the available wireless communications resources into a plurality of groups based on network traffic characteristics. For an embodiment, the network traffic characteristics include network traffic patterns over time.

For an embodiment, the characteristics of the datum include a time sensitivity of the datum. Some datums of the data sources are more urgent than others. For an embodiment, the characteristics of the datum include a size of data associated with the datum. Some datums are associated with greater amounts of data. If, for example, the datum is a part of a large filed, the datum may be assigned a different resource group than if the datum is a part of a smaller file. A datum that is a part of a 1 KB file may be assigned a resource group at night which may be a less congested time of the day.

For an embodiment, the available wireless communications resources include frequency subcarriers, time slots, or RACH (random access channel) slots. For an embodiment, the RACH slots include a plurality of preambles and a plurality of RACH time slots. As will be described, for an embodiment plurality of RACH time slots can be periodic. When a wireless device is transmitting, the wireless device uses assigned preamble and the assigned RACH time slot for transmission. For an embodiment, the wireless device wirelessly communicates using an assigned preamble and an assigned RACH time slot for uplink wireless communication.

For an embodiment, the available wireless communications resources are adaptively divided into a plurality of groups based on network traffic characteristics for uplink wireless communications and downlink wireless communications. For an embodiment, the available downlink wireless communications resources comprise frequency subcarriers, time slots, or broadcast slots.

For an embodiment, the available wireless communications resources are independently divided into a plurality of groups for uplink wireless communications and downlink wireless communications based on network traffic characteristics. That is, the groupings for uplink wireless communications can be divided into groups independent of the groupings for downlink wireless communications, and vice versa. For an embodiment, the network traffic characteristics includes characteristics of both uplink and/or downlink traffic.

Further, for an embodiment, the wireless device can feedback preferences for particular groups. For example, a wireless device can feedback a preferred time and/or data requirement.

For an embodiment, the base station obtains the network traffic characteristics based on historical observation or statistics shared by a core network or application-level services. That is, the network traffic characteristics are collected at a high-level than the base station and can include the characteristics associated with multiple base stations. For at least some embodiments, the network traffic characteristics includes link quality characteristics over time per groups of wireless devices or individual wireless devices, and therefore, group assignments are influenced accordingly. Each base station may form groups based on the network traffic characteristics, including channel utilization by the base station observed at different times of the day, types and distribution of data traffic (bursty data traffic, periodic data traffic, SOS—emergency data traffic, delay tolerant data traffic), and/or data traffic delay observed historically. If, for example, the data traffic is dominated by SOS/real time traffic, the base station assigns more resources in a delay sensitive traffic group.

At least some embodiments further include maintaining, by the base station, a map of network frequency subcarriers, time slots, RACH slots available for wireless communication, assigning, by the base station, unallocated available wireless communications resources to newly connecting wireless device, wherein unallocated available wireless communications resources include 1. unallocated groups of available wireless communications resources or 2. groups of available wireless communications resources not fully allocated (this is related to the traffic shaping). This embodiment ensures better utilization of the available resources. For an embodiment, the base station maintains a map of network slots/resources group allocations. When a wireless device connects to the base station, the base station assigns resources which are unallocated or sub-allocated (not fully allocated, below capacity allocations). That is, the additional wireless device is allocated to an existing group. For an embodiment, each of the groups can be assigned to multiple wireless devices, not just one.

For an embodiment, each RACH slot includes a preamble and times slots. For an embodiment, each RACH (random access channel) includes a preamble Id and time slots. For an embodiment, each RACH time slot includes multiple preamble Ids. A connecting wireless device chooses one of the available preamble Ids for accessing a RACH slot.

For an embodiment, each of the RACH time slots is defined by a period and an offset. For an embodiment, the period includes an expiry time (or validity duration). That is, the period of the RACH time slot is operative until the expiry time or until the validity duration has been passed. For an embodiment, the expiry time is based on the attach status of the wireless device and/or network characteristics.

For an embodiment, the values of the period and the offset are dependent on the time sensitivity of the datums. For an embodiment, the values of the period and offset provide data traffic shaping and reduce the possibility of different wireless devices transmitting at the same time. For an embodiment, a value of the period is based on available resources, current traffic and historical transmissions by the device (if this information is available). As previously described, for an embodiment, a value of the period for each of different of the plurality groups is selected based on a geometric series of scheduling frames or scheduling sub-frames. For an embodiment, the time of the geometric series is selected based upon the data transmission requirement and/or historical traffic pattern observed for the device. As previously described, for an embodiment, while dividing a pRACH (periodic random-access channel) slot into periodic groups, the base stations can have different numbers of preambles in different groups.

For an embodiment, a modem within the wireless device receives a data transmission request from a user application layer of the wireless device along with the maximum delay the datums can tolerate. For an embodiment the device may support emergency services, in which the service must transmit the alert within 5 seconds and as such the maximum delay which can be tolerated by the application service is 5 seconds. For an embodiment, the wireless device allocates the datums to the appropriate group based on the maximum delay the datums can tolerate.

For an embodiment, allocating the set of the plurality of groups to the wireless devices includes coordinating allocations between the base station and other base stations to the wireless device and other wireless devices to manage network contention between coverage areas of the base station and the other base stations. That is, for an embodiment, multiple base stations (including at least some satellite network base station and/or at least some terrestrial network base station) are electronically connected to an MME (mobility management element). For an embodiment, the allocation of groups by the base stations is coordinated between base stations to manage network contention. That is, each base station is operating to allocate sets of the groups of wireless communication resources to wireless devices connecting to each of the base stations. For an embodiment, a satellite network base station may generate a plurality of resource groups X, and a terrestrial base station may generate a plurality of resource groups Y, wherein when these networks are overlapping the intersection set of X and Y is null. That is, the allocated wireless communication resources of the different networks are orthogonal to reduce interference between wireless communications of the different networks.

For an embodiment, when the wireless device connects to the base station the wireless device provides a device type identifier. For an embodiment, the base station allocates resource groups based upon the device type identifier. For example, during a RRC (radio resource control) connection the wireless device signals its device type. For example, a message 5 is used for the RRC connection setup as per NB-IOT standard. The base station then accordingly assigns a PRACH (periodic random-access channel) resource group that includes periodic, aperiodic PRACH window, or PRACH pattern.

Figure 4:
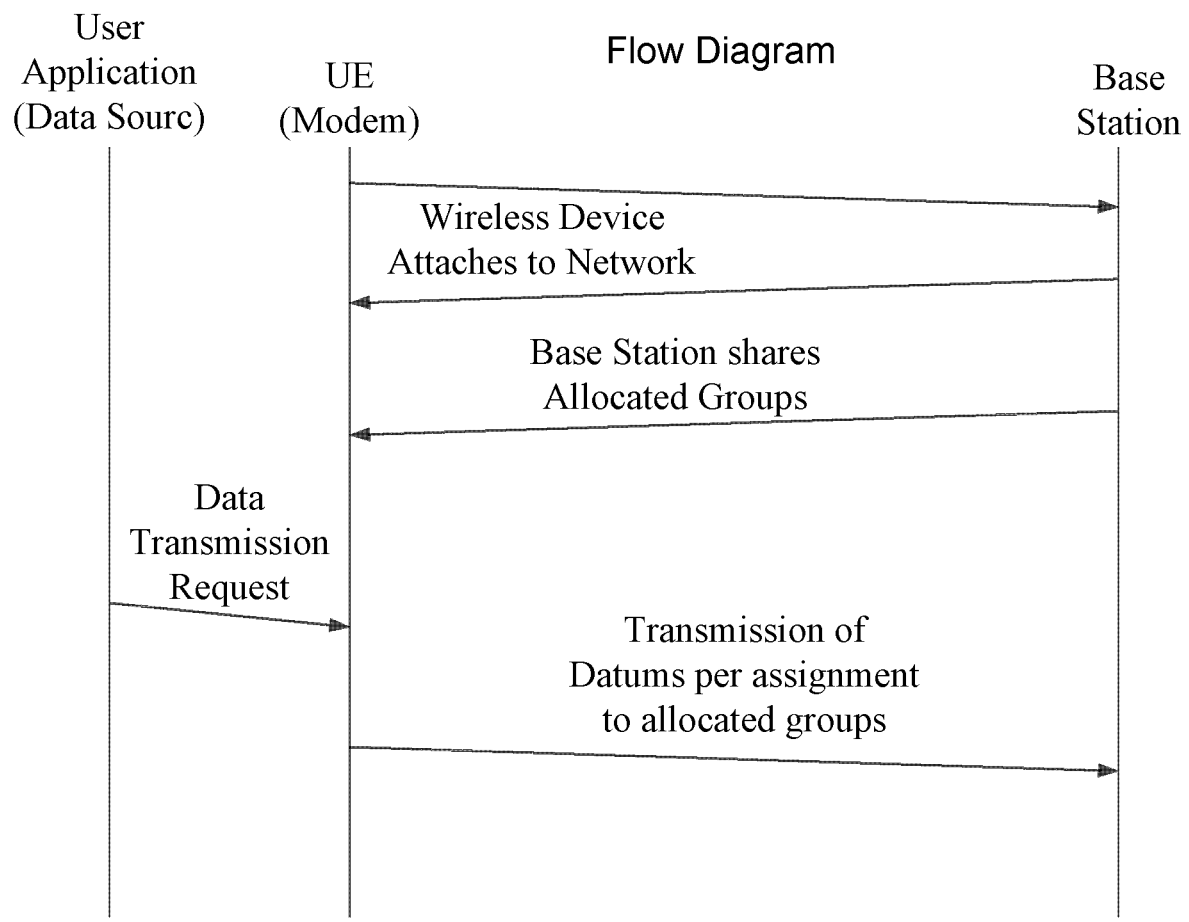
FIG. 4 is a flow diagram that includes a sequence of events of assigning datums to groupings of wireless communications resources based on characteristics of the datums, according to an embodiment.

FIG. 4 is a flow diagram that includes a sequence of events of assigning datums to groupings of wireless communications resources based on characteristics of the datums, according to an embodiment. As shown, first a UE (user element, which is a wireless device) attaches to the satellite network through a base station. The UE is provided data for uplink transmission from a data source that can be internal or external to the UE. The base station then shares allocated groups of the wireless communication resources for utilization by the UE. The UE receives a data request from the data source, which the UE then assigns to the allocated groups. The UE then uplink wirelessly communicates the data of the data source to the base station through a wireless link.

Figure 5:
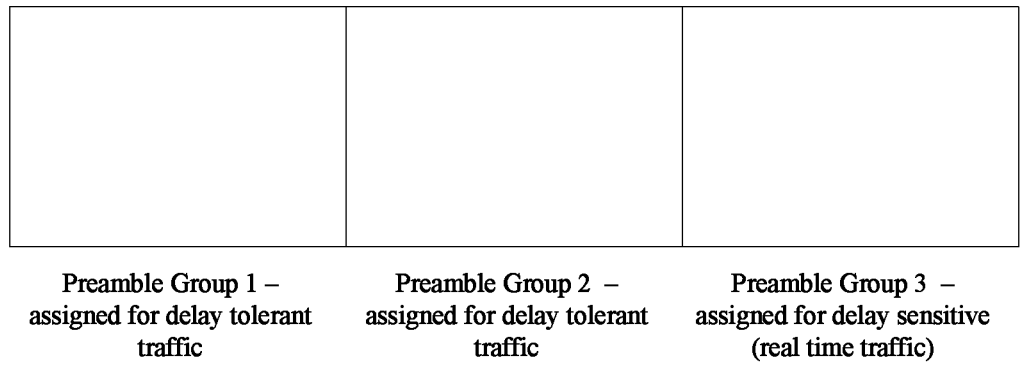
FIG. 5 shows RACH slots for delay tolerant and delay sensitive traffic, according to an embodiment.

FIG. 5 shows RACH slots for delay tolerant and delay sensitive traffic, according to an embodiment. FIG. 5 shows examples of preamble groups similar to the P1 preamble of FIG. 2. FIG. 5 provides 3 preamble groups of the RACH, wherein the preamble group include multiple preamble codes of the RACH.

Figure 6:
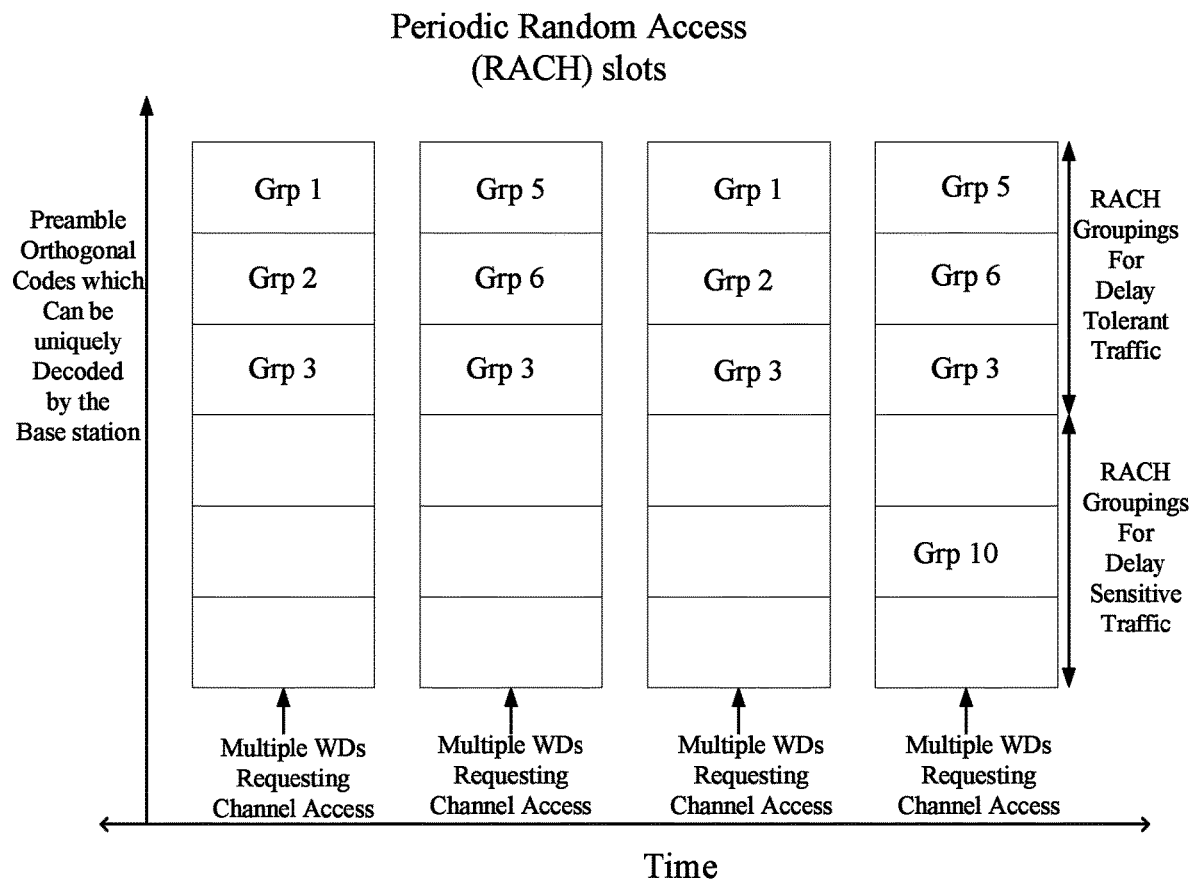
FIG. 6 shows RACH slots having various periods and offsets, according to an embodiment.

FIG. 6 shows RACH slots having various periods and offsets, according to an embodiment. As shown, groups Grp1 and Grp3 have different periods, and groups Grp1 and Grp5 have different offsets (wherein the offset is a time or timing offset). As described, RACH Preamble groups can be assigned different periods and offsets. As describe, some of the RACH preamble groups can be periodic. For example, in the FIG. 6, group 3 has higher periodicity than group 1 and group 2. Group 1 and 2 have same periodicity as group 5 and group 6, but a different offset. A wireless device can be assigned groups of different periodicity. For an embodiment, based on the data characteristics, device can choose the group for transmission.

For an embodiment a wireless device (which reports, for example, periodic water pressure readings of a water tank assigned two sets of resource groups that the wireless device periodically reports. One of the reports may be a pressure reading (an example of delay tolerant data) using low periodicity RACH group 1, and leakage information (time sensitive) which is reported using high periodicity or delay sensitive RACH preamble groups.

Figure 7:
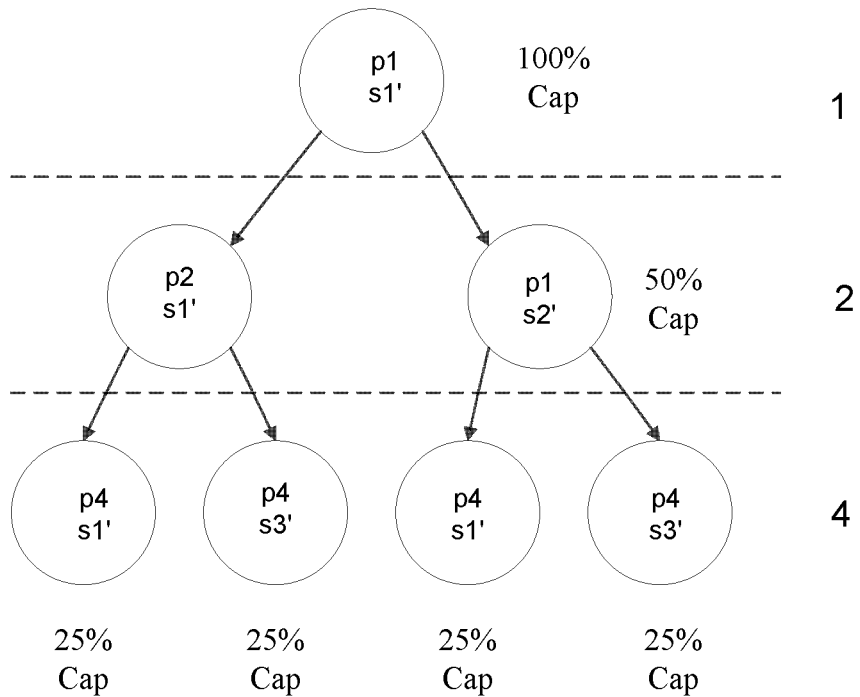
FIG. 7 shows a scheduling algorithm, according to an embodiment.

FIG. 7 shows a scheduling algorithm, according to an embodiment. FIG. 7 shows an example of a scheduling (group formation) algorithm wherein a given preamble can be assigned to the groups with periods from a geometric series of 2. For various embodiments, different preambles are assigned different of the series. For an embodiment, once a preamble is assigned to a series, the periodicity of the group is chosen from the assigned geometric series, thereby ensuring that no two groups have the same RACH slot.

For example, in FIG. 7, a given preamble can be assigned to a group of period $2^{\wedge}n$, where n is an integer. The offset for the groups are assigned such that two different groups do not have overlapping RACH slots. Examples of periodicity assigned to different groups of a given preamble include one group of periodicity 1, two groups of periodicity 2, one group of periodicity 2, 2 groups of periodicity 4, or 4 groups of periodicity 4.

Figure 8:
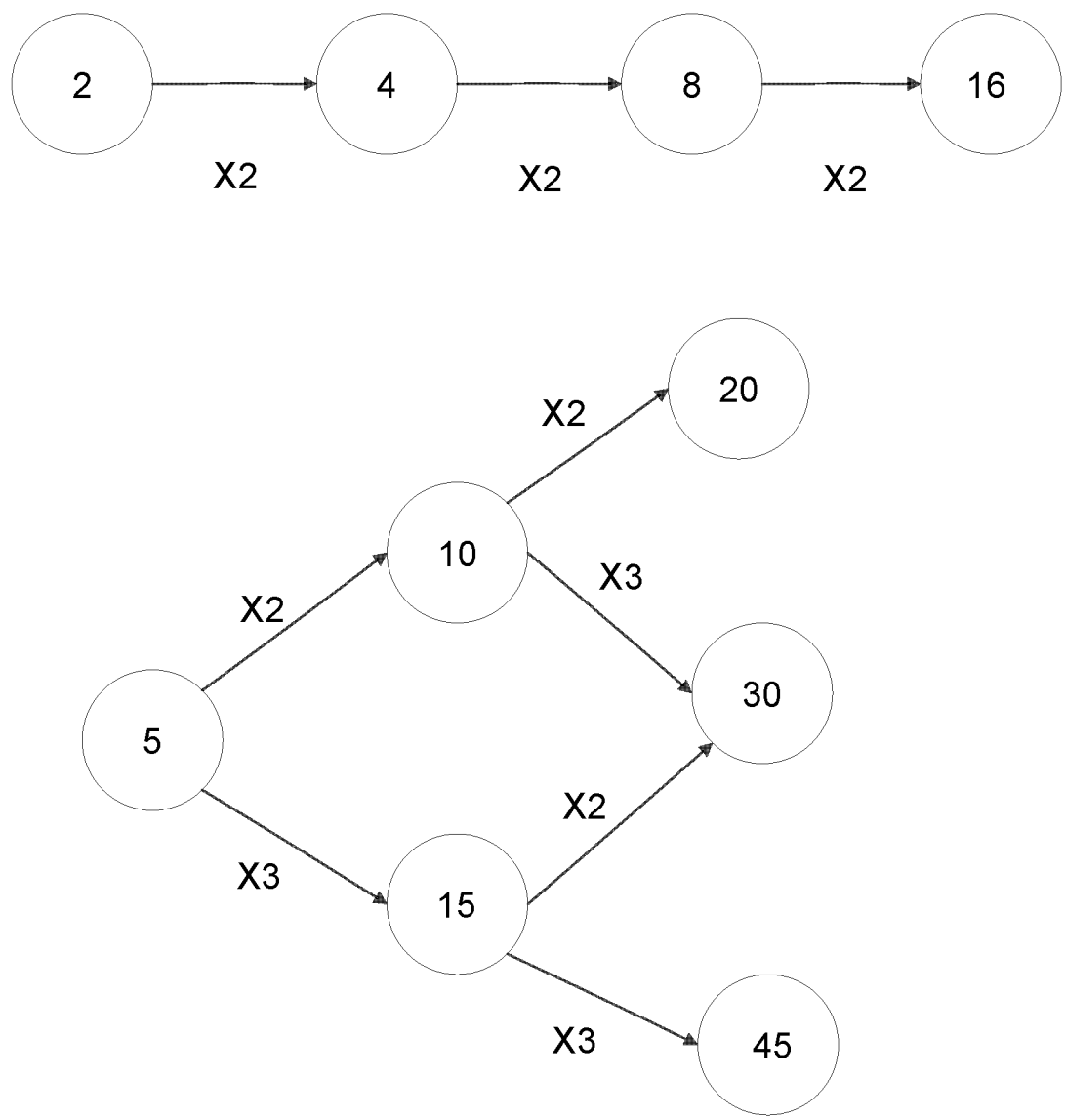
FIG. 8 shows different valid periodicities of data transmission, according to an embodiment.

FIG. 8 shows different valid periodicities of data transmission, according to an embodiment. FIG. 8 represents example of series for which a given preamble or a groups of preambles are assigned to a series, and once assigned have periods of a sequence. Examples of sequences of the periods can include, for example, 2, 4, 8, 16, 32, or 5, 10, 20, 40, 80, or 5, 10, 15, 20, 30, 34, 40, 60.

Although specific embodiments have been described and illustrated, the embodiments are not to be limited to the specific forms or arrangements of parts so described and illustrated. The described embodiments are to only be limited by the claims.

What is claimed:
1. A method of wireless communication, comprising:
dividing available wireless communications resources into a plurality of groups;

connecting, by a wireless device, to a base station through a wireless satellite link;
allocating, by the base station, a set of the plurality of groups to the wireless device;
receiving, by the wireless device, a datum from a data source;
assigning, by the wireless device, the datum to one or more of the set of the allocated plurality of groups comprising selecting, by the wireless device, a random access preamble from a list of random access preambles available in the allocated set of the plurality of groups to initiate transmission of the datum based on characteristics of the datum, wherein different random access preambles determine a corresponding pattern of frequency and time within a plurality of random access preamble slots; and
wirelessly communicating, by the wireless device, the datum to the base station according to the assigned one or more of the set of the allocated plurality of groups.

2. The method of claim 1, wherein dividing available wireless communications resources into a plurality of groups comprises adaptively dividing the available wireless communications resources into a plurality of groups based on network traffic characteristics.

3. The method of claim 2, wherein the network traffic characteristics comprise network traffic patterns over time.

4. The method of claim 1, wherein the characteristics of the datum include at least one of a time sensitivity of the data or a size of data associated with the datum.

5. The method of claim 1, wherein the available wireless communications resources include RACH slots, and wherein the RACH slots include a plurality of preambles and a plurality of RACH time slots.

6. The method of claim 1, wherein the wireless device wirelessly communicates using an assigned preamble and an assigned RACH time slot for uplink wireless communication.

7. The method of claim 1, wherein the available wireless communications resources are adaptively divided into a plurality of groups based on network traffic characteristics for uplink wireless communications and downlink wireless communications.

8. The method of claim 1, wherein the available wireless communications resources are independently divided into a plurality of groups for uplink wireless communications and downlink wireless communications based on network traffic characteristics.

9. The method of claim 2, wherein the base station obtains the network traffic characteristics based on historical observation or statistics shared by a core network or application-level services.

10. The method of claim 1, further comprising:
maintaining, by the base station, a map of network frequency subcarriers, time slots, RACH slots available for wireless communication;
assigning, by the base station, unallocated available wireless communications resources to newly connecting wireless device;
wherein unallocated available wireless communications resources include 1. unallocated groups of available wireless communications resources or 2. groups of available wireless communications resources not fully allocated.

11. The method of claim 5, wherein each of the RACH slots are defined by a period and an offset.

12. The method of claim 11, wherein values of the period and the offset are dependent on a time sensitivity of the datum.

13. The method of claim 12, wherein a value of the period for each of different of the plurality groups is selected based on a geometric series of scheduling frames or scheduling sub-frames.

14. The method of claim 1, wherein a modem within the wireless device receives a data transmission request from a user application layer of the wireless device along with the maximum delay the datum can tolerate.

15. The method of claim 14, wherein the wireless device allocates the datum to the appropriate group based on the maximum delay the datum can tolerate.

16. The method of claim 1, wherein allocating the set of the plurality of groups to the wireless devices comprises coordinating allocations between the base station and other base stations to the wireless device and other wireless devices to manage network contention between coverage areas of the base station and the other base stations.

17. A satellite wireless communication system, comprising:
a wireless device;
a base station, the base station configured to:
divide available wireless communications resources into a plurality of groups;
allocate a set of the plurality of groups to the wireless device;
the wireless device configured to:
connect to the base station through a wireless satellite link;
receive a datum from a data source;
assign the datum to one or more of the set of the allocated groups comprising selecting, by the wireless device, a random access preamble from a list of random access preambles available in the allocated set of the plurality of groups to initiate transmission of the datum based on characteristics of the datum, wherein different random access preambles determine a corresponding pattern of frequency and time within a plurality of random access preamble slots; and
wirelessly communicate the datum to the base station according to the assigned one or more of the set of the allocated plurality of groups assign the datum to one or more of the set of the allocated plurality of groups.

* * * * *